United States Patent
Choi

(10) Patent No.: US 8,272,593 B2
(45) Date of Patent: Sep. 25, 2012

(54) ROTATIONAL BOTTOM BLADE TYPE FLIGHT VEHICLE

(75) Inventor: Key Nam Choi, Seoul (KR)

(73) Assignee: Suntech Enterprises, Seoul (KR)

( * ) Notice: Subject to any disclaimer, the term of this patent is extended or adjusted under 35 U.S.C. 154(b) by 0 days.

(21) Appl. No.: 13/001,993

(22) PCT Filed: Jul. 1, 2009

(86) PCT No.: PCT/KR2009/003597
§ 371 (c)(1), (2), (4) Date: Dec. 29, 2010

(87) PCT Pub. No.: WO2010/005203
PCT Pub. Date: Jan. 14, 2010

(65) Prior Publication Data
US 2011/0101156 A1    May 5, 2011

(30) Foreign Application Priority Data
Jul. 7, 2008  (KR) .................. 10-2008-0065306

(51) Int. Cl.
*B64C 29/00* (2006.01)
(52) U.S. Cl. .................. 244/23 D; 244/23 C; 244/17.11; 244/12.2
(58) Field of Classification Search ............. 244/6, 12.2, 244/12.4, 12.5, 17.11, 23 A, 23 C, 23 D, 244/23 R
See application file for complete search history.

(56) References Cited

U.S. PATENT DOCUMENTS

| | | |
|---|---|---|
| 5,152,478 A | 10/1992 | Cycon |
| 5,295,643 A | 3/1994 | Ebbert et al. |
| 6,550,715 B1 | 4/2003 | Reynolds |
| 6,634,593 B2 | 10/2003 | Lepretre et al. |
| 2005/0082421 A1 | 4/2005 | Perlo |

FOREIGN PATENT DOCUMENTS

KR    20-2007-0000055 U    1/2007

OTHER PUBLICATIONS

International Search Report of International Application No. PCT/KR2009/003597, dated Feb. 23, 2010.

*Primary Examiner* — Tien Dinh
*Assistant Examiner* — Nicholas McFall
(74) *Attorney, Agent, or Firm* — Kile Park Goekjian Reed & McManus PLLC

(57) ABSTRACT

Conventional bottom blade type flight vehicles have a complex structure and complex flying control operations in that several pairs of fixing plates, and forward/backward and left and right rotation adjustment blades are separately mounted and adjusted to remove the anti-torque of the flight vehicle caused by the rotation of the propellers and to fly the flight vehicle, so that the flight vehicles has difficulties in scouting and surveillance of an indoor area due to the heavy weight and the great volume. The flight vehicle of the disclosure continuously rotates in a state in which the anti-torque is not removed by one adjustment blade. The flight vehicle stops, ascends, descends, advances forward, backward, leftward, or rightward, or left or right rotates, performs flight in a narrow space, scouting and surveillance in an indoor area with a simple structure, simple control, light weight, and small size, and increases power efficiency.

5 Claims, 4 Drawing Sheets

[Fig. 1]
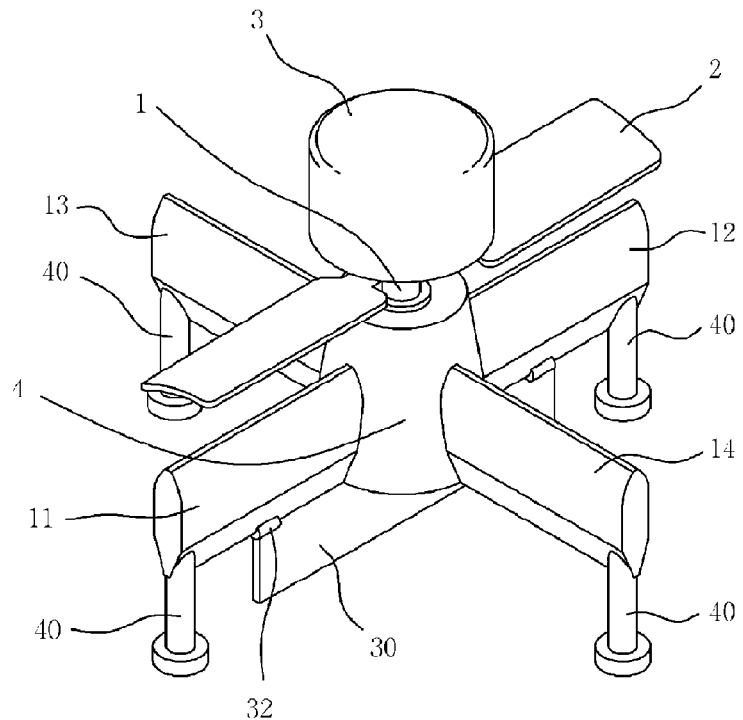
[Fig. 2]
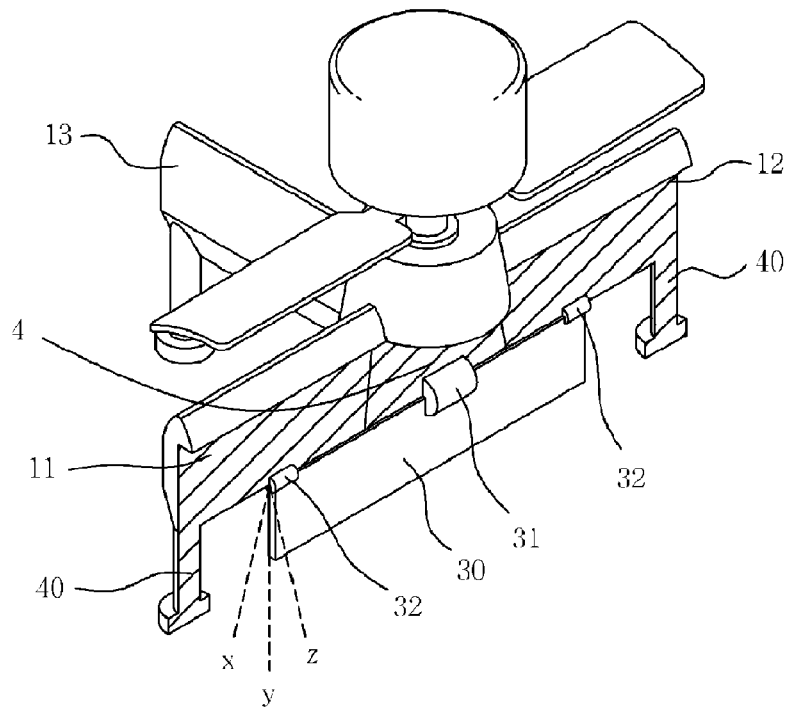

[Fig. 3]
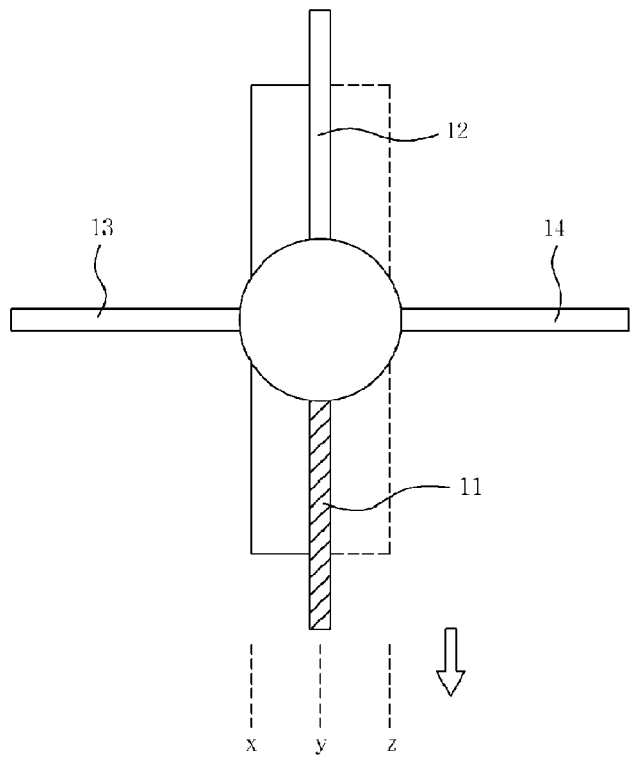
[Fig. 4]
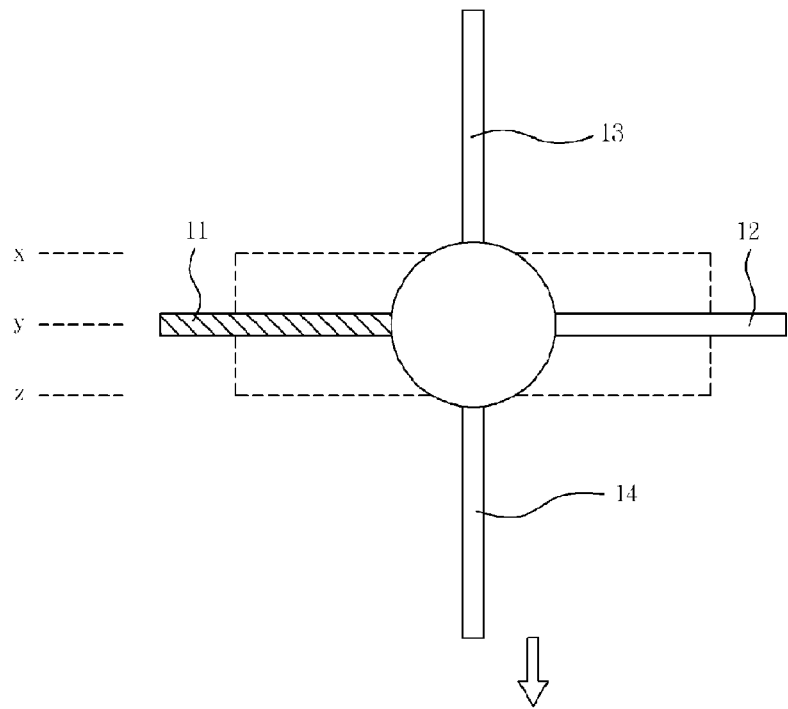

[Fig. 5]
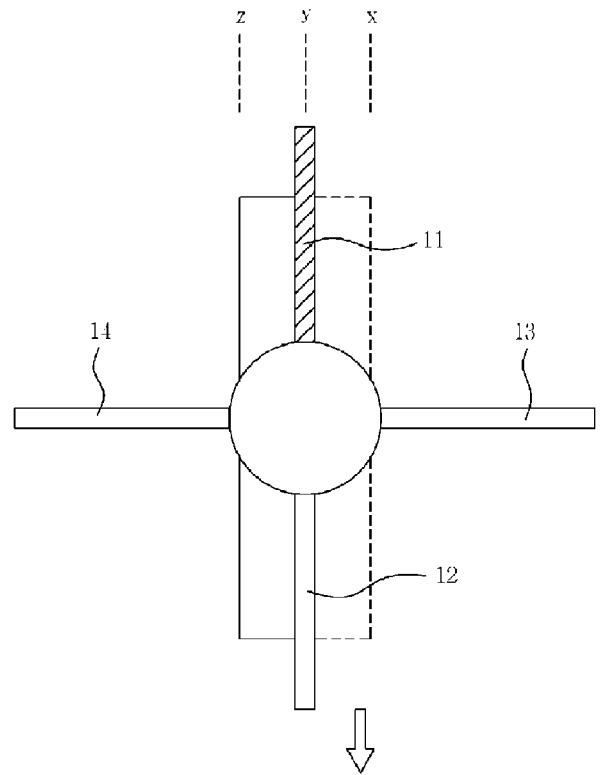
[Fig. 6]
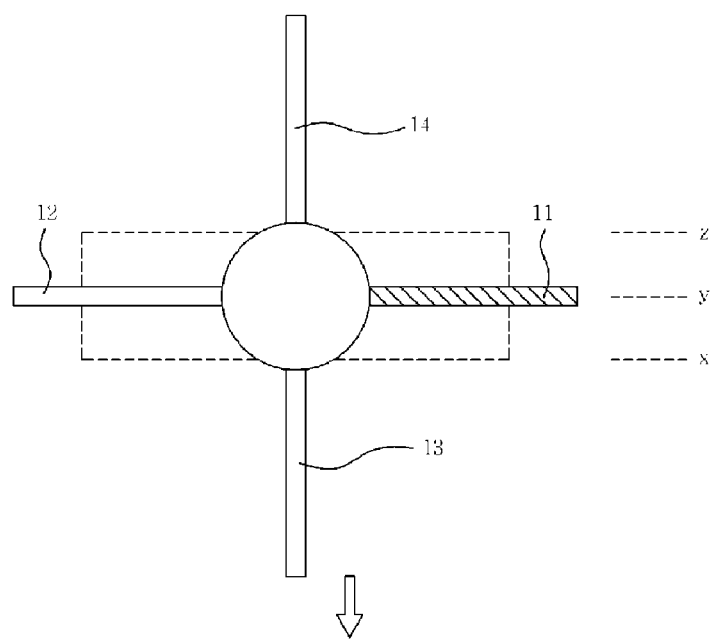

[Fig. 7]
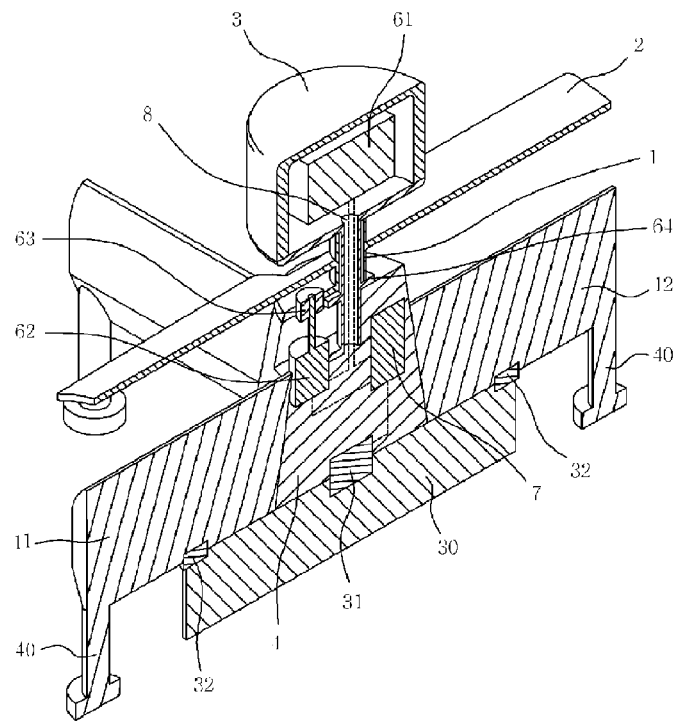
[Fig. 8]
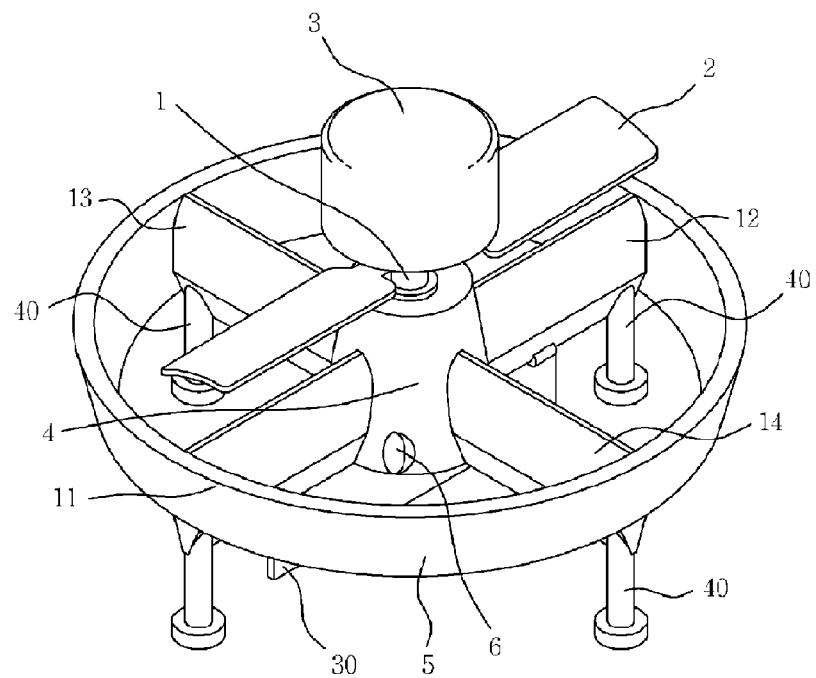

us 8,272,593 B2

ROTATIONAL BOTTOM BLADE TYPE FLIGHT VEHICLE

TECHNICAL FIELD

The present invention relates to a bottom blade type flight vehicle which is a kind of unmanned rotational blade type flight vehicles.

BACKGROUND ART

In general, a bottom blade type flight vehicle includes a propeller and a plurality of adjustment blades. The bottom blade type flight vehicle rotates the propeller using power and adjusts the adjustment blades for ascending, descending, forward and backward advancing, stoppage, left and right rotation, and leftward and rightward advancing.

A conventional bottom blade type flight vehicle requires a plurality of fixing plates and a plurality of adjustment blades in order to remove anti-torque of the flight vehicle and perform forward and backward advancing, left and right rotation, and leftward and rightward advancing.

In order to remove the instability and the anti-torque of the flight vehicle caused by the rotation of the propeller, an inclined fixing plate must be mounted, or a device of frequently adjusting the adjustment blades is required. However, in this case, the structure of the flight vehicle becomes very complex and a device is necessary to be added. Accordingly, the volume and the weight of the flight vehicle are increased.

In addition, there has been required a small bottom blade type flight vehicle having light weight and less volume to fly in a narrow space and having a simplified structure to fly for a long time, so that the small bottom blade type flight vehicle can perform scouting and surveillance while flying in the air.

DISCLOSURE

Technical Problem

The present invention has been made to solve the problems occurring in the related art, and an object of the present invention is to provide a rotational bottom blade type flight vehicle, in which the flight vehicle does not require anti-torque, has the simple structure and control by employing one adjustment blade instead of a plurality of adjustment blades, can be realized with light weight and less volume, can advance forward, backward, leftward, or rightward and left or right-rotates while rotating, so that power efficiency can be increased.

Technical Solution

In order to accomplish the above objects, according to one embodiment of the present invention, there is provided a bottom blade type flight vehicle. The anti-torque of the bottom blade type flight vehicle is not removed. In the structure of the bottom blade type flight vehicle, a fixed pitch propeller is horizontally mounted about a central shaft, a power unit is mounted above the central shaft of the fixed pitch propeller, and a control unit is mounted below the central shaft of the fixed pitch propeller. First to fourth fixing plates are arranged in a form of a cross about the control unit in such a manner that one ends of the first to third fixing plates are fixed to the control unit and opposite ends of the first to fourth fixing plates are provided at lower portions thereof with legs. One adjustment blade is coupled with lower portions of the first and second fixing plates through hinges while crossing the control unit. The adjustment blade is operated by an adjustment device mounted on a lower portion of the control unit.

DESCRIPTION OF DRAWINGS

FIG. 1 is a perspective view showing a rotational bottom blade type flight vehicle according to the present invention;

FIG. 2 is a sectional perspective view showing the rotational bottom blade type flight vehicle of FIG. 1, a part of which is cut;

FIG. 3 is a schematic plan view showing the states of fixing plates and an adjustment blade of FIG. 2 in the forward advancing of the flight vehicle;

FIG. 4 is a schematic plan view showing the states of the fixing plates and the adjustment blade when the flight vehicle of FIG. 3 rotates at an angle of 90 degrees;

FIG. 5 is a schematic plan view showing the states of the fixing plates and the adjustment blade when the flight vehicle of FIG. 3 rotates at an angle of 180 degrees;

FIG. 6 is a schematic plan view showing the states of the fixing plates and the adjustment blade when the flight vehicle of FIG. 3 rotates at an angle of 270 degrees;

FIG. 7 is a partially-sectional perspective view showing the structure of the rotational bottom blade type flight vehicle according to the present invention; and FIG. 8 is a perspective view showing a rotational bottom blade type flight vehicle according to another embodiment of the present invention.

BEST MODE

Mode for Invention

Hereinafter, a rotational bottom blade type flight vehicle according to the exemplary embodiment of the present invention will be described with reference to accompanying drawings.

According to the present invention, a fixed pitch propeller 2 is horizontally mounted about a central shaft 1, a power unit 3 is provided at an upper portion of the central shaft 1 of the propeller 2, and a control unit 4 is provided at a lower portion of the central shaft 1 of the propeller 2. First to fourth fixing plates 11 to 14 are arranged in the form of a cross in such a manner that one ends of the first to third fixing plates 11 to 14 are fixed to the control unit 4 and the other ends of the first to fourth fixing plates 11 to 14 are provided at the lower portions thereof with legs 40 longitudinally fixed thereto. One adjustment blade 30 is mounted on the lower portions of the first and second fixing plates 11 and 12 by using hinges 32 while crossing the control unit 4. The adjustment blade 30 is configured to be moved by an adjustment unit 31 mounted on the control unit 4 as shown in FIG. 2.

As shown in FIG. 7, the central shaft 1 has a hollow cylindrical pipe shape. A connection wire 8 extends through the inside of the central shaft 1 to connect the power unit 3 and the control unit 4, which adjust the flight vehicle, to each other. In addition, the propeller 2, which is rotated by the power unit 3, is fixed to an outer portion of the central shaft 1.

The first to fourth fixing plates 11, 12, 13, and 14 have the same shape. Especially, the first to fourth fixing plates 11 to 14 have the same streamlined shape such that wind generated by the rotation of the propeller 2 can smoothly flow downward.

The adjustment blade 30 has the shape of a rectangular plate. The adjustment blade 30 is transversely mounted at the lower portions of the control unit 4 and the first and second fixing plates 11 and 12 through the hinges 32, so that the adjustment blade 30 can be operated through the adjustment of the adjustment unit 31 installed at the lower portion of the control unit 4, thereby adjusting the flight of the flight vehicle.

The legs 40 protect the flight vehicle, the adjustment blade 30, and the first to fourth fixing plates 11 to 14 when the flight vehicle takes off or lands.

The present invention provides an unmanned rotational blade type flight vehicle. Accordingly, the flight vehicle can be controlled in wireless. In addition, differently from a conventional flight vehicle, the flight vehicle has no uniform directionality, and the anti-torque of the flight vehicle is not removed but maintained. Therefore, while continuously rotating, the flight vehicle not only ascends and descends, but stops, rotates leftward or rightward, advances forward or backward, or advances leftward or rightward.

FIG. 2 is a sectional perspective view showing the rotational bottom blade type flight vehicle in which parts of the first fixing plate 14 and the control unit 31 of FIG. 1 are cut. As shown in FIG. 2, the adjusting blade 30 is mounted at the lower portions of the first and second fixing plates 11 and 12 through the hinges 32 while crossing the control unit 4, such that the adjusting blade 30 can be moved through the adjustment of the adjustment unit 31.

As shown in FIGS. 1 and 2, if the propeller 2 rotates counterclockwise by power in a state in which the adjustment blade 30 is vertically spread, that is, in a state in which the adjustment blade 30 is placed in a position y, the flight vehicle ascends or descends while rotating clockwise due to anti-torque.

In addition, after the flight vehicle ascends by rotating the propeller 2, the flight vehicle stably stays at a predetermined position while continuously rotating clockwise at a predetermined rotational speed of the propeller 2, called hovering flight according to the present invention.

FIGS. 3, 4, 5, and 6 are schematic plan views showing the positions of the first to fourth fixing plates 11, 12, 13, and 14, which are provided below the propeller 2, and the motion state of the adjusting blade 30 in order to explain a fundamental operating principle of the flight vehicle to advance forward from the state of the hovering flight on the assumption that the flight vehicle moves downward as marked in arrows of FIGS. 3, 4, 5, and 6 to advance forward. Particularly, FIGS. 3, 4, 5, and 6 show divided operations of the flight vehicle in which the first to fourth fixing plates 11, 12, 13, and 14 and the adjusting blade 30 rotate by 90 degrees clockwise.

In addition, FIGS. 3 to 6 are views based on the first fixing plate 11, and the first fixing plate 11 is marked by using oblique lines for the purpose of explanation.

The flight vehicle according to the present invention flies while continuously rotating. In detail, if the propeller 2 is rotated counterclockwise, the flight vehicle rotates clockwise due to the anti-torque. As shown in FIG. 3, if the adjustment blade 30 comes to a position x in a state in which the first fixing plate 11 is directed downward, force is generated to allow the flight vehicle 11 to advance in the direction of the arrow. As shown in FIG. 4, if the position of the adjustment blade 30 is adjusted to a position y when the flight vehicle rotates at an angle of 90 degrees, the flight vehicle becomes in a hovering flight state. As shown in FIG. 5, if the adjustment blade 30 is adjusted to a position z when the flight vehicle rotates at an angle of 180 degrees, the flight vehicle advances again in the direction of the arrow. As shown in FIG. 6, if the adjustment blade 30 is adjusted to the position y when the flight vehicle rotates at an angle of 270 degrees, the flight vehicle becomes in the hovering flight state. If the adjustment blade 30 comes to the position x again when the flight vehicle rotates at an angle of 360 degrees to return to the state of FIG. 3, the flight vehicle flies while rotating in the direction of the arrow.

If the adjustment blade 30 is adjusted to the position y of FIG. 4, the position z of FIG. 5, and the position y of FIG. 6 from the position x of FIG. 3 in a state in which the oblique-lined first fixing plate 11 is directed downward and the flight vehicle is in the hovering flight state, and then returns to the position x of FIG. 3 while the flight vehicle is making one revolution, the flight vehicle advances in the direction of the arrow while continuously rotating.

FIGS. 3, 4, 5, and 6 show the divided operations of the flight vehicle for the purpose of explanation. For example, if the flight vehicle makes eight revolutions per one second, FIGS. 3, 4, 5, and 6 show a significantly swift operation in which the flight vehicle makes one revolution for ⅛ second. In this case, the instant operation of the adjustment blade 30 is automatically controlled by a micro-processor embedded in the control unit 4 of the control device 7.

In contrast, in order to adjust the adjustment blade 30 such that the flight vehicle advances backward in a direction of the second fixing plate 12 opposite to the direction of the arrow, the adjustment blade 30 is subsequently adjusted the positions y, x, y, and z from the position z in a state in which the oblique-lined first fixing plate 30 is directed downward while the flight vehicle is making one revolution. In this case, the flight vehicle advances backward in the direction of the second fixing plate 12 which is opposite to the direction of the arrow while continuously rotating.

For the purpose of the forward and backward advancing, left and right rotation, and leftward and rightward advancing of the flight vehicle, the adjustment blade 30 is repeatedly adjusted according to the adjustment principle when the first fixing plate 11 comes to a position corresponding to the flight direction, so that the flight vehicle can fly in the desirable direction.

As described above, stoppage, forward and backward advancing, leftward and rightward advancing, and left and right rotation of the flight vehicle can be performed by controlling only one adjustment blade 30, and the configuration for the above operation can be simplified.

Therefore, according to the present invention, the stoppage, forward and backward advancing, leftward and rightward advancing, and left and right rotation of the flight vehicle can be performed by using only one adjustment blade. In addition, the anti-torque of the flight vehicle caused by the rotation of the propeller 2 is not necessary to be removed, so that the adjustment operation and equipment necessary to remove the anti-torque are not required. Accordingly, a small-size flight vehicle with a simple structure, a light weight, and a less volume can be realized, and power efficiency can be more improved as compared with that of the conventional flight vehicle. In addition, the duration of flight of the flight vehicle can be increased.

According to the present invention, as shown in FIG. 1, the fixed pitch propeller 2 is used, so that the weight of the flight weight is distributed to the upper and lower directions about the central shaft 1 of the propeller 2, so that the flight vehicle can achieve horizontal stabilization due to the restoring force thereof.

In addition, since the flight vehicle according to the present invention is a revolution body, the flight vehicle has the stability thereof. Further, since the flight vehicle continuously rotates, the flight vehicle has an advantage in that the flight vehicle is less outstanding that another flight vehicle in a stationary state.

Referring to FIG. 7, the power unit 3 having a power source 61 is disposed on an upper portion of the central shaft 1 of the propeller 2. The power unit 3 supplies power to components provided at a lower portion of the flight vehicle through the connection wire 8 passing through the central shaft 1 having a cylindrical pipe shape. In addition, an external gear 64, a power device 62, a power gear 63, the control device 7, the adjustment blade 30, the first to fourth fixing plates 11 to 14, and the legs 40 are provided at the lower portion of the central shaft 1 of the fixed pitch propeller 2 in such a manner that the weight of the flight vehicle can be distributed in the upward and downward directions about the propeller 2. In this case, positions of the power unit 3 and the control unit 4 may be interchanged by taking the balance of the weight and the design rule into consideration such that the center of gravity of the flight vehicle can be located at a contact portion between the propeller 2 and the central shaft 1. In this case, the fourth fixing plate 14 is not shown in FIG. 7.

Hereinafter, the operation of the present invention will be described with reference to FIG. 7. The control device 7 receiving the power through the connection wire 8 connected to the power source 61 controls the power device 62 and the power gear 63 fixed to a shaft of the power device 62 is rotated. Thus, the external gear 64 engaged with the power gear 63 is also rotated, so that the fixed pitch propeller 2 is rotated. Accordingly, the flight vehicle flies.

In addition, according to the present invention, the flight vehicle includes a position recognizing device to recognize the position and the direction of the flight vehicle, and lamps are provided at the front end of the fixing plates, so that the positions of the fixing plates can be distinguished from each other during flying of the flight vehicle.

FIG. 8 is a view showing a flight vehicle including a camera 6 provided at the front of the control unit 4 and a circular frame 5 that has a ring shape, blocks external wind, and serves as a path for more smoothly transferring wind to the first to fourth fixing plates 11, 12, 14, and 14 and the adjustment blade 30 as the wind is generated through the rotation of the propeller 2.

As shown in FIG. 8, if the camera 6 serving an image sensor is mounted at the front of the control unit 4 above the first fixing plate 11, the camera 6 takes a picture while the flight vehicle is continuously rotating. Accordingly, when the first fixing plate 11 is placed at the position of FIG. 3, the camera 6 photographs a front image. When the fixing plate 11 is placed at the position of FIG. 4, the camera 6 photographs a left-side image, and, when the first fixing plate 11 is placed at the position of FIG. 5, the camera 6 photographs a rear-side image. In addition, when the first fixing plate 11 is placed in the position of FIG. 6, the camera 6 photographs a right-side image.

Therefore, when the flight vehicle makes eight revolutions per one second, the camera 6 can photograph 32-frame images per one second. Accordingly, the flight vehicle can watch all around through one camera.

In contrast, a non-rotational flight vehicle requires four cameras to watch all around. However, since the rotational flight vehicle according to the present invention can watch all around through one camera, the weight and the volume of the flight weight can be reduced, and a device structure can be simplified.

Accordingly, the size of the flight vehicle can be reduced, so that the flight vehicle can easily fly in an indoor area and a narrow space. In addition, the flight vehicle is equipped with a surveillance device, so that the flight weight can easily perform scouting and surveillance.

INDUSTRIAL APPLICABILITY

As described above, a conventional bottom blade type flight vehicle requires a plurality of adjustment blades, so that the structure of the flight vehicle is very complex, and the flight vehicle must be equipped with devices accompanying with the adjustment blades. Accordingly, the bottom blade type flight vehicle has a heavy weight and a great volume.

According to the present invention, the anti-torque of a flight vehicle is not removed, but the rotational state of the flight vehicle is maintained, so that the flight vehicle can perform stoppage, left and right rotation, forward and backward advancing, and leftward and rightward advancing through one adjustment blade. Accordingly, a small-size flight vehicle can be realized with a simple structure, light weight, and less volume.

As described above, the size of the flight vehicle can be reduced, so that the flight vehicle can fly even in an indoor weight and a narrow space. Since the flight vehicle rotates, the flight vehicle can easily scout and watch all around through a surveillance device, the power efficiency can be increased, and the duration of the flight of the flight vehicle can be increased.

The invention claimed is:

1. A bottom blade type flight vehicle comprising:
a fixed pitch propeller horizontally mounted about a central shaft;
a power unit mounted above the central shaft of the fixed pitch propeller; and
a control unit mounted below the central shaft of the fixed pitch propeller,
wherein the control unit is provided at a lower portion thereof with an adjustment unit and one adjustment blade,
wherein first to fourth fixing plates are arranged in a form of a cross about the control unit in such a manner that one ends of the first to fourth fixing plates are fixed to the control unit and opposite ends of the first to fourth fixing plates are provided at lower portions thereof with legs longitudinally fixed thereto, and
wherein the adjustment blade is mounted on the adjusting unit and coupled with lower portions of the first and second fixing plates through hinges.

2. The bottom blade type flight vehicle of claim 1, wherein the bottom blade type flight vehicle performs ascending, descending, stoppage, forward advancing, backward advancing, left rotation, right rotation, leftward advancing, or rightward advancing while rotating by adjusting the fixed pitch propeller and the adjustment blade.

3. The bottom blade type flight vehicle of claim 1, wherein the control unit includes a control device, and controls the control device to adjust the adjustment blade according to rotation states of the bottom blade type flight vehicle.

4. The bottom blade type flight vehicle of claim 1, wherein a camera is mounted on a front surface of the control unit,
wherein the first to fourth fixing plates are arranged in the form of a cross about the control unit in such a manner that the one ends of the first to fourth fixing plates are fixed to the control unit and the opposite ends of the first to fourth fixing plates are transversely fixed to a circular frame, and wherein the circular frame is provided at a lower portion thereof with legs longitudinally fixed thereto.

5. The bottom blade type flight vehicle of claim 4, wherein the bottom blade type flight vehicle performs ascending, descending, stoppage, forward advancing, backward advancing, left rotation, right rotation, leftward advancing, or rightward advancing while rotating.

* * * * *